United States Patent Office 3,506,552
Patented Apr. 14, 1970

3,506,552
PREPARATION OF VINYL CHLORIDE FROM ETHANE USING CHLORINE WITH ACTINIC LIGHT
James P. Russell, Berkeley Heights, N.J., assignor to Air Reduction Company, Incorporated, New York, N.Y., a corporation of New York
No Drawing. Filed Mar. 31, 1967, Ser. No. 627,294
Int. Cl. B01j 1/10; C07c 21/06, 17/00
U.S. Cl. 204—163           9 Claims

ABSTRACT OF THE DISCLOSURE

Vinyl chloride is prepared by the photochemical chlorination of ethane with chlorine at 250° to 400° C. with a contact time of 2 to 20 seconds.

---

This invention relates to the preparation of halogenated hydrocarbons and more particularly to the preparation of vinyl chloride. Specifically, it relates to a photochemical process for producing vinyl chloride and other halogenated hydrocarbons such as ethyl chloride and dichloroethanes useful in preparing vinyl chloride.

Vinyl chloride is an extremely versatile material and finds major use in a wide variety of applications such as in the preparation of polymers for coatings, textile finishes, rigid products such as pipes, and the like. At present vinyl chloride is made commercially from either acetylene or ethylene or a combination of both depending on economics of the particular location of the manufacturing plant. One method of major commercial importance involves the hydrochlorination of acetylene using anhydrous hydrogen chloride in the presence of a mercuric chloride catalyst. In another method, ethylene is first chlorinated to ethylene dichloride which is then thermally or catalytically dehydrochlorinated to vinyl chloride. As can be seen, each of these processes commences from either acetylene or ethylene, material which are at least one step, and usually a difficulty practiced step, removed from the basic, widely available hydrocarbon raw materials from which they are prepared. In view of this, a great deal of interest has developed in recent years in alternate routes to vinyl chloride. Unfortunately, most of these routes suffer one or more disadvantages in that they require drastic conditions, or large excesses of non-hydrocarbon starting materials, or yield large amounts of by-products which are not commercially desirable. It would thus be very desirable, indeed, if a basic, low cost hydrocarbon starting material could be converted in a direct one stage process to vinyl chloride and commercially useable by-products. It is an object of this invention to provide such a process.

By commercially desirable by-products are meant those products which are of use within the technology of vinyl chloride production, or are eminently useful in their own right. For example, both 1,1 dichloro and 1,2 dichloroethanes are considered commercially desirable since they can be converted into vinyl chloride. Ethyl chloride is likewise useful, though not as desirable as the dichloroethanes, since it may be converted to dichloroethane by chlorination. On the other hand, trichloroethane, although suitable for preparing vinylidene chloride; and other higher halogenated hydrocarbons, are considered to be not as desirable as the dichloroethanes and ethyl chloride. Hydrogen chloride, useful in a variety of industrial applications, is a desirable by-product.

In accordance with the present invention, it has been discovered that when a vapor feed mixture of chlorine and ethane is exposed to light of sufficient intensity and quality to cause a photochemical reaction between the ethane and chlorine, and the resulting vapor reaction mixture is allowed to become heated, said heated vapor reaction mixture is found to contain varying, but substantial, amounts of vinyl chloride, ethyl chloride, dichloroethane and hydrogen chloride. The relative amounts of these products depends in large measure on the relative amounts of chlorine and ethane in the feed mixture, the intensity of incident light thereupon, and the temperature of the heated reaction mixture, as will be described in more detail hereinafter. The process is particularly suited to being carried out in continuous fashion, and it is preferred to do so.

In carrying out the process of the present invention the vapor mixture feed of chlorine and ethane is introduced, preferably continuously, into a suitable reactor and exposed to chemically-active light. It is preferred that the exposition be effected by dispersing the vapor feed mixture in a suitable liquid medium. This may be achieved by providing a suitable liquid within the reactor system, continuously flowing the vapor feed mixture through the liquid medium, thereby forming a vapor-liquid dispersion from which a vapor reaction mixture, continuously emanates. Both the gas-liquid dispersion, and the vapor phase emanating therefrom are exposed to the chemically-active light.

When carried out in the preferred mode described, the effect of the chemically-active light is to induce photochemically an exothermic reaction between the chlorine and ethane in the vapor feed mixture which results in a heated vapor reaction mixture. As stated above, the temperature to which the reaction mixture is heated is an important characteristic in the process. Variations in product distribution are observed depending on how this temperature varies. In general, it may be said that good yields of commercially useable materials are obtained at vapor reaction mixture temperatures varying from 150 to 500° C. It is preferred, for best results, to employ vapor temperatures of the order of 250° C. to 400° C. in which range the vapor reaction mixture, after removal of by-produced hydrogen chloride, contains vinyl chloride in amounts as much as 10% by weight and large amounts of ethyl chloride (about 40–45% by weight), and dichloroethanes (about 40–50% by weight).

Attending this are high conversions of ethane to chlorinated hydrocarbons, the conversion figures usually ranging from 75–88%. Trichloroethanes are obtained in the reaction mixture in amounts generally less than 7% by weight and usually around 4–5% by weight. The use of lower reaction mixture temperatures tends to increase the amount of the trichlorinated products obtained.

The temperature of the reaction mixture is conveniently obtained, in accordance with a feature of this invention, by utilizing the heat of reaction generated as a result of the photochemical combination of chlorine and ethane. If the self-generated temperature is too high, suitable cooling means may be introduced into the reactor to achieve proper values. Similarly, if it is too low, auxiliary heating means can be introduced. As a further added features of the invention, however, an interrelationship has been noted between the relative proportion of chlorine and ethane in the feed mixture on the one hand, and the intensity of incident light upon said mixture on the other, each with respect to the temperature which the reaction mixture attains. Thus, by utilizing variations in feed mixture constituent concentrations and incident light intensities, sufficient heat is generated to produce desirable reaction mixtures. For example, and with reference to the vapor feed mixture, when chlorine:ethane mole ratios of from 1.5–2:1 are employed, reaction mixture temperatures ranging from 85°–255° C. are obtained when incident light intensity is above about 135 foot candles. Mole ratios below this range tend to produce vapor reaction mixtures gradually decreasing in temperature with decreasing mole ratios to the point where said temperature is about the same as the gas-liquid dispersions of which more will be recited hereinafter. Nevertheless, such mole ratios are employable, as are higher ratios since it is preferred in the process to utilize primarily the incident light intensity as a means for achieving desirable temperatures. With regard to the mole ratios, although values of from 0.9 to 2.2:1 may be employed, values of from 0.9–1.8 and preferably from 1.0–1.7:1 moles chlorine per mole ethane produce substantial amounts of commercially useable material, while production of other material is substantially suppressed. Values above this range tend to yield pronounced amounts of the trihalogenated materials whereas values below the range favor production of large amounts of ethyl chloride relative to dichloroethanes. Most preferred is a mole ratio of from 1.2–1.4 moles chlorine per mole ethane.

As stated, it is preferred to utilize the intensity of light incident upon the gas-liquid dispersion and the vapor reaction mixture continuously emanating therefrom as the primary means by which desirable temperatures of the vapor reaction mixture is obtained. In this regard, suitable results are obtained when the intensity is between 50 to 500 foot candles, and preferably between 80 to 200 foot candles. In practice, the values at the lower end of the preferred range, for example 80–150 foot candles, are most preferred and result in good yields of vinyl chloride, ethyl chloride and dichloroethanes. In this connection, and while it is not intended to limit the invention to theoretical considerations, it is believed that at the most preferred conditions of incident light and vapor feed mixture constituent mole ratios, the reaction rate in the liquid dispersion, relative to that in the vapor phase above the dispersion is reduced somewhat compared to those rates developed at other conditions. This causes some, although probably a small amount of reaction to occur in the vapor phase leading to a vapor temperature which is increased over that of the liquid dispersion, probably in consequence of the lower capacity of the gases, relative to the liquid, to absorb the heat of reaction.

The period of contact time that the vapor reaction mixture remains heated is suitably controlled by adjusting the flow rate of the gases in consideration of the dimensions of the reacting equipment to give suitable space velocities. In general, contact times ranging from 2 to 20 and preferably from 8 to 12 seconds are suitable. These may be achieved by directing the vapor reaction mixture emanating from the liquid medium through a space, the dimensions of which are easily calculated by one skilled in the art, considering the volume flow rate of vapor and the time desired. Space velocities of the vapor reaction mixture, calculated as volume of vapor flowing per unit volume of space through which it flows per unit time, ranging from 150 to 800 and preferably from 200 to 550 liter/liter/hour, are suitable for producing contact times within the above ranges.

With regard to the space velocity through the liquid, it is convenient to represent this as the unit volume of gas flowed through a unit volume of liquid (measured at rest) per hour. So defined, suitable space velocities through the liquid range from 100–800 and preferably 200–550 liters vapor feed mixture/liter of dispersion liquid measured at rest/hour. In practice, it is convenient to use reactor equipment having a uniform cross section so that at a given space velocity through the liquid, the desirable space velocity through the vapor space may be achieved merely by providing appropriate length above the liquid surface. Suitable results are obtained when this length is about twice as long as the effective liquid depth.

By effective liquid depth is meant the depth of liquid through which the vapor feed mixture actually traverses rather than the actual depth of liquid as charged. For example, when the vapor feed mixture is introduced into the bottom of a vertical reactor containing the liquid, the vapor will pass through the entire length of liquid depth, in which case the effective depth is the same as the actual depth. If it were introduced at the mid-point, the effective depth would be about one-half the actual depth.

The liquid used as the dispersing medium may be either aqueous or organic and is preferably inert with respect to its reactivity with chlorine, ethane, vinyl chloride and other reaction products. Illustrative of aqueous media are aqueous solutions of acids such as hydrochloric acid, and phosphoric acid, acetic acid and the like. Acetic acid gradually chlorinates under the photochlorination conditions and is therefore not preferred. Illustrative of organic media are perfluoro-tri-n-butylamine, fluoro-chloro compounds, such as "Halocarbon" and "Kel–F," oils (low polymers of trifluoro-chloro ethylene) and carbon tetrachloride, and the like. The preferred medium is hydrochloric acid in concentrations ranging from 10 to 39% with the concentrated hydrochloric acid, i.e. about 38% being preferred.

When an aqueous liquid medium is employed, best results are obtained when the temperature of the liquid phase is between 30° C. and 70° C. and preferably from 40 to 60° C. Higher temperatures may be used for organic liquids, but in general it is preferred to operate in the range of 40 to 70° C. Similarly, the pressure under which the process is carried out is suitably above atmospheric, the kinetic pressure of the flowing system being convenient. Ordinarily, pressures in the range of from 800–1000 mm. Hg are encountered.

As a result of carrying out the above described process, there is obtained a vapor reaction mixture containing predominantly commercially usable materials such as vinyl chloride, hydrogen chloride, ethyl chloride and dichloroethanes, the latter being obtained in the form of both 1,1 dichloro and 1,2 dichloroethane isomers in the mole ratio of about 3.3–3.5:1, respectively. When carried out at 350° C. for vapor reaction mixture temperatures at contact times of 10 seconds, 8:6 for chlorine:ethane mole ratios, and 135 foot candles of incident light, the process surprisingly produces large amounts of vinyl chloride and may be regarded as a vinyl chloride process. The products may be separated and recovered by techniques well known in the art. For example, the hot vapor reaction gases are first preferably rapidly quenched to minimize side reactions and then submitted to a water scrubbing to remove hydrogen chloride. The scrubbed gases may then be cooled to liquid form and separated by low temperature fractionation.

The light used for initiating the photochemical reaction may be any normally used in reactions of this type. It has been termed chemically-active which is meant to include daylight, sunlight, or any chemically-active artificial light, e.g. radiation in the ultra-violet, visible, and infrared regions, having a wave length in the 2000–8000 A. range. It may be derived from any source normally employed in this art, but it is preferred, purely for reasons of economy and ease of control to use fluoroescent light sources, which have good light intensity in the region of 2400–3500 A.

The following examples are given for purposes of illustration only and are not to be construed as limiting the invention.

EXAMPLES 1–4

A Pyrex reactor tube, 48 in. by 2 in., is fitted at the bottom with a drain stopcock, two gas inlet tubes with coarse porosity sintered glass thimbles, a 24 in. by 1½ in. internal cooling coil of 6 mm. Pyrex tubing, a thermometer for measuring vapor phase temperatures mounted 17 in. above the top of the cooling coil, and, at the top of the reactor, a 10 in. by 1 in. still packed with ⅛ in. glass helices which act as a spray trap. The still head is fitted with a U-tube manometer to read the reactor pressure.

The still head is connected to a product collection system which consists of a 50 cm. coil condenser connected to a jacketed produce receiver which is equipped with a bottom drain and a gas outlet at the top. The gas outlet is conncted to a 42 cm. coil condenser of which the off-gas side leads to the scrubbing section. The entire product collection system is operated at −5 to −10° C. by use of a cooling system which consists of a pump to circulate methanol which is cooled in a coil immersed in a Dry Ice-water-methanol mixture.

The scrubbing section consists of two 4 in. by 48 in. tubes fitted at the bottom with gas inlet and drain. Each scrubbing tower is filled to a depth of 6 in. with ¼ in. ceramic Berle saddles. Each srubber contains 5 liters of water. These scrubbing towers are connected in series with a third scrubber of similar design but made of 36 in. of 1½ in. Pyrex tubing and holding 750 cc. of water. This scrubbing prevents carry-over of aqueous HCl spray to the drying tower which is connected in series with the scrubbers. The drying tower consists of a tower of similar design as the small scrubber but completely filled with 10–20 mesh anhydrous $CaSO_4$. The entire scrubbing and drying section is interconnected with Black Tygon tubing and the towers themselves painted black to prevent light from initiating reactions between unreacted ethane and chlorine which might be carried over from the reactor. The drying tower is connected to a trap system held at Dry Ice temperatures to catch any unreacted chlorine and small amounts of volatile chloroethanes which might carry through the system.

The trap system consists of three coil-type bulb traps. Two are in parallel and the third in series. The parallel traps are connected to the drying tower through a three-way stopcock which permits operation of one or the other or both traps simultaneously. The third trap is connected to a gas washing bottle containing 500 cc. of 10% NaOH solution and this is connected to a gas washing bottle containing 500 cc. of distilled water. This, in turn, is connected to a 1 liter/rev. wet test meter which is used to measure the volume of any off-gas.

The reactor section is positioned between two conventional 48 in. 40 watt fluorescent tubes in such a manner that the tubes and the reactor form an isosceles triangle having 5 in. base and 3 in. sides with the reactor at the apex.

One liter of concentrated hydrochloric acid is placed in the reactor tube, the acid filling about 15 in. of the tube. The entire system is then purged for 5 minutes with nitrogen. Thereafter, the product collection system is cooled to −10° C. Ethane is then started through the hydrochloric acid at a rate of 100 liters/hr. After 5 minutes chlorine is started at 50 liters/hr. The rates are then gradually adjusted to supply a total of 350 liters per hour of chlorine-ethane mixture in the mole ratio of 1.33 moles chlorine per mole ethane. During this time, the temperature in the reactor rises to 35–38° C. Cooling water is then turned on at a flow of 180–220 cc./min. After 15–20 min., the gas flows and reactor temperatures reach steady state conditions. All scrubbers and traps are on and sampling is begun. The product receiver is drained hourly into a bottle pre-cooled to −78° C. to provide samples for analysis. The samples are analyzed by gas chromatography by allowing the samples to warm up to room temperature and vaporize, with added heat treatment of the residue to remove any high boilers left at room temperature.

The foregoing procedure is followed in runs in which the intensity of incident light is varied as shown in the table below, and as determined by a standard photocel measuring device. The chlorinated hydrocarbon production in weight percent of total vapor reaction mixture, after removal of hydrogen chloride, is indicated.

TABLE I

| Ex. | Incident light foot candles | Vapor temp. (° C) | $C_2H_5Cl$ (wt. percent) | $C_2H_3Cl$ (wt. percent) | $C_2H_4Cl_2$ (wt. percent) | $C_2H_3Cl_3$[1] (wt. percent) | Percent conversion ethane to cholorinated products[2] |
|---|---|---|---|---|---|---|---|
| 1 | 360 | 275 | 42.8 | 1.2 | 48.9 | 7.3 | 84.5 |
| 2 | 225 | 290 | 44.4 | 3.5 | 46.4 | 5.6 | 82.0 |
| 3 | 135 | 325 | 42.0 | 9.8 | 43.9 | 4.4 | 75.3 |
| 4 | 85 | >350 | 44.7 | 5.6 | 44.3 | 4.0 | 80.0 |

[1] Obtained as both isomers in mole ratio of approximately 3.4 moles of 1,1 dichloroethane to one mole of 1,2 dichloroethane.
[2] Total conversion of ethane is somewhat higher, some of the ethane being converted to ethylene. Chlorine conversion is essentially quantitative, approximately 50 mole percent going to chlorinated hydrocarbons and 50 percent going to hydrogen chloride.

What is claimed is:

1. The process for producing vinyl chloride which comprises dispersing a vapor feed mixture comprising chlorine and ethane in mole ratios of about 0.9 to 2.2:1 in a relatively inert liquid and exposing the dispersed vapor feed mixture to actinic light to produce a vapor reaction mixture, and maintaining said vapor reaction mixture at a temperature in the range of from 250° C. to 400° C. and at a contact time from 2 to 20 seconds.

2. The process according to claim 1 wherein the method is carried out under continuous gas flow conditions.

3. The process according to claim 1 wherein the mole ratio of chlorine to ethane is between 1.0–1.7:1, the intensity of light incident upon said vapor feed mixture and vapor reaction mixture is between 80–200 foot candles, whereby substantial amounts of vinyl chloride, ethyl chloride, hydrogen chloride and dichloroethanes are produced.

4. The process according to claim 4 wherein the vapor feed mixture is continuously dispersed through said relatively inert liquid thereby to form a vapor-liquid dispersion and a vapor reaction mixture continuously emanating therefrom.

5. The process according to claim 4 wherein the vapor feed mixture is flowed at a space velocity of from 150 to 800 liters/liter of liquid phase/hr.

6. The process of claim 5 wherein the relatively inert liquid is hydrochloric acid.

7. The process of claim 6 wherein the mole ratio of chlorine to ethane is from 1.2–1.4:1, and the temperature of the vapor reaction mixture of the vapor phase is between 300° C. and 375° C.

8. The process according to claim 4 for producing vinyl chloride wherein the mole ratio of chlorine:ethane is from 1.2–1.4:1, the temperature of the vapor reaction mixture is between 300–375° C., the contact time at said temperature is between 8–12 seconds, and the intensity of incident light is from 80–200 foot candles.

9. The process according to claim 8 wherein the relatively inert liquid is hydrochloric acid.

References Cited

UNITED STATES PATENTS

| | | | |
|---|---|---|---|
| 1,520,506 | 12/1924 | Payne et al. | 204—163 |
| 2,393,509 | 1/1946 | Archibald | 204—163 |
| 2,453,691 | 11/1948 | Hill | 204—163 |
| 2,589,689 | 3/1952 | Governale et al. | 204—163 |
| 3,287,240 | 11/1966 | Tsutsumi | 204—163 |

BENJAMIN R. PADGETT, Primary Examiner

U.S. Cl. X.R.

204—162

UNITED STATES PATENT OFFICE
CERTIFICATE OF CORRECTION

Patent No. 3,506,552     Dated April 14, 1970

Inventor(s) James P. Russell

It is certified that error appears in the above-identified patent and that said Letters Patent are hereby corrected as shown below:

Col. 1, line 39, "material" should read -- materials --;
     line 40, "difficulty" should read -- difficultly --.

Col. 2, line 58, "features" should read -- feature --.

Col. 5, line 3, "produce" should read -- product --;
     line 27, "srubber" should read -- scrubber --.

Col. 6, line 41, "claim 4" should read -- claim 1 --.

SIGNED AND SEALED
AUG 25 1970

(SEAL)
Attest:

Edward M. Fletcher, Jr.
Attesting Officer

WILLIAM E. SCHUYLER, JR.
Commissioner of Patents